US012556885B2

(12) United States Patent
Araújo et al.

(10) Patent No.: US 12,556,885 B2
(45) Date of Patent: Feb. 17, 2026

(54) PREDICTING PERFORMANCE OF A LOCALIZATION-RELATED DEVICE

(71) Applicant: Telefonaktiebolaget LM Ericsson (publ), Stockholm (SE)

(72) Inventors: José Araújo, Stockholm (SE); Bryan Donyanavard, Stockholm (SE); Ioannis Karagiannis, Kalamata (GR); Ananya Muddukrishna, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 18/024,884

(22) PCT Filed: Sep. 21, 2020

(86) PCT No.: PCT/EP2020/076252
§ 371 (c)(1),
(2) Date: Mar. 6, 2023

(87) PCT Pub. No.: WO2022/058031
PCT Pub. Date: Mar. 24, 2022

(65) Prior Publication Data
US 2024/0015479 A1    Jan. 11, 2024

(51) Int. Cl.
*H04W 4/029* (2018.01)
*G01C 21/00* (2006.01)
(Continued)

(52) U.S. Cl.
CPC ........ *H04W 4/029* (2018.02); *H04B 17/3913* (2015.01); *H04W 4/33* (2018.02); *G01C 21/3848* (2020.08)

(58) Field of Classification Search
None
See application file for complete search history.

(56) References Cited

U.S. PATENT DOCUMENTS

| | | | |
|---|---|---|---|
| 2016/0253761 A1* | 9/2016 | Davey | B65G 1/1373 705/4 |
| 2018/0183660 A1* | 6/2018 | Byers | H04L 41/16 |
| 2018/0276049 A1* | 9/2018 | Kattepur | G06F 11/3428 |

OTHER PUBLICATIONS

Donyanavard, Bryan, "Abstract for "SPARTA: Runtime task allocation for energy efficient heterogeneous manycores"", 3rd IEEE International Conference on Computer and Communications (ICCC); https://ieeexplore.ieee.org/document/7750975, 2017, pp. 1-3.

(Continued)

*Primary Examiner* — Adolf Dsouza
(74) *Attorney, Agent, or Firm* — Murphy, Bilak & Homiller, PLLC

(57) ABSTRACT

Embodiments include methods performed by a predictor device for facilitating predictions related to localization and/or mapping performance of one or more devices of a device network. Such methods include detecting that a first localization-related device has joined the device network and obtaining a first set of properties of the first localization-related device. Such methods also include determining, based on the first set of properties, a predictive model for the first localization-related device and deploying the predictive model for the first localization-related device. Other embodiments include predictor devices configured to perform such methods.

18 Claims, 3 Drawing Sheets

(51) Int. Cl.
*H04B 17/391* (2015.01)
*H04W 4/33* (2018.01)

(56) References Cited

OTHER PUBLICATIONS

Raza, Usman, et al., "What Does Model-Driven Data Acquisition Really Achieve in Wireless Sensor Networks?", Pervasive Computing and Communications (PerCom), 2012 IEEE International Conference, https://www.researchgate.net/publication/224969177_What_does_model-driven_data_acquisition_really_achieve_in_wireless_sensor_networks, Mar. 2012, pp. 1-8.

Zheng, Xinnian, et al., Abstract for "Accurate phase-level cross-platform power and performance estimation"; DAC 16: Proceedings of the 53rd Annual Design Automation Conference, Jun. 2016, pp. 1-3.

\* cited by examiner

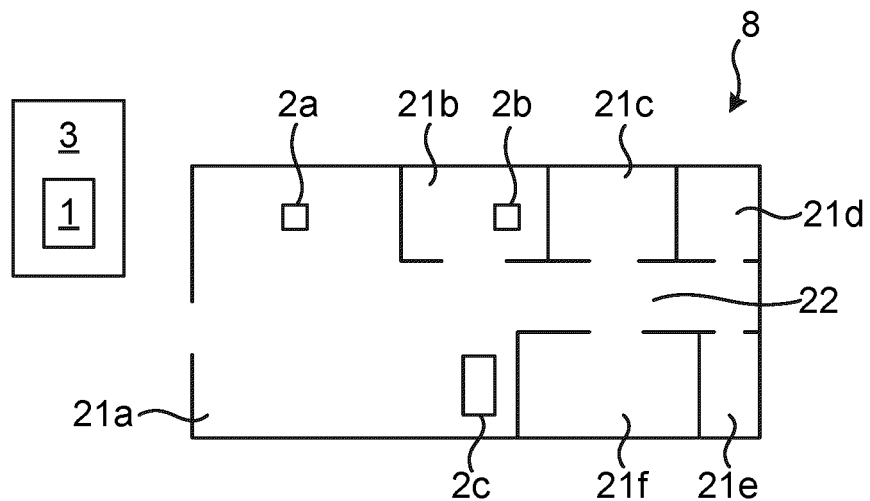
Fig. 1
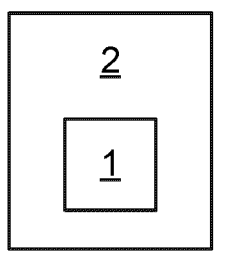 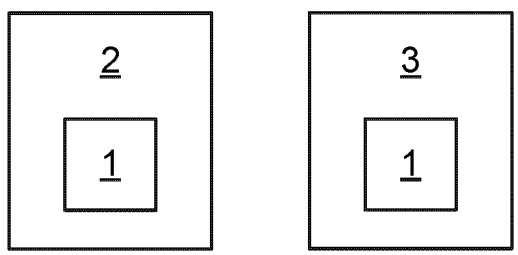 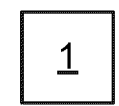
Fig. 2A  Fig. 2B  Fig. 2C
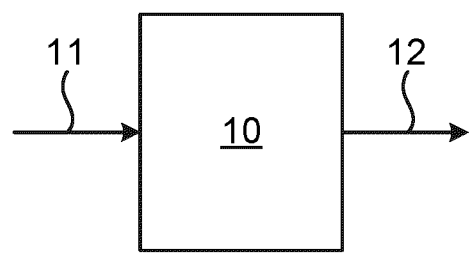
Fig. 3

PREDICTING PERFORMANCE OF A LOCALIZATION-RELATED DEVICE

TECHNICAL FIELD

The present disclosure relates to the field of localization and/or mapping and in particular to predicting performance of a localization-related device.

BACKGROUND

Localization is used for many applications, such as self-driving cars, unmanned aerial vehicles, robots, as well as for augmented reality (AR) and virtual reality (VR) applications. Localization is the process of determining the pose of a device/object in space. Pose is made up of both position and orientation.

Localization for mobile devices such as handheld phones, tablets, head-mounted displays (HMDs), autonomously mobile devices, and remote-controlled mobile devices can be performed by merging structural (visual and/or depth-related) information from cameras, lidar, etc., and motion information from Inertial Measurement Units (IMUs). In this way, the device is able to acquire six degrees of freedom movements of the user (position and rotation). This information can be used for both localization and mapping. Mapping is the process of generating a map which can later be used for localization. The localization is based on a localization map comprising features representing visual and/or structural elements in the real world. By capturing visual or structural information (e.g., using a camera or lidar), and comparing the captured information with the features in the localization map, the pose of the mobile device can be determined.

When both localization and mapping is combined, the process of learning an area while keeping track of a current position and orientation of the mobile device, is known as Simultaneous Localization and Mapping, or SLAM.

SLAM allows exploring the physical space around the user, including indoor and outdoor navigation without using GPS (Global Positioning System), which typically is not available inside a building.

The SLAM algorithm can be used for AR, for capturing and storing a localization map used for AR applications as, e.g., placing virtual objects (e.g., a virtual TV, painting, pet, etc.) in a room and allowing these objects to virtually remain in the room so that the user can see them again when returning to the room. Moreover, the SLAM algorithm allows the AR devices to localize themselves inside a room or buildings and continuously perform six degrees of freedom tracking of the user so that the user can interact with virtual objects.

The mapping and localization can be quite resource demanding, especially for devices that are mobile and thus considerably resource constrained. Networks of devices can be used to distribute tasks in this computational effort.

SUMMARY

One object is to improve prediction of performance, related to localization and/or mapping, of a localization-related device.

According to a first aspect, it is provided a method for enabling predicting performance of a localization-related device in relation to localization and/or mapping, the localization-related device forming part of a device network. The method is performed in a predictor device and comprises the steps of: detecting that a first localization-related device joins the device network; obtaining a first set of properties of the first localization-related device; determining, based on the first set of properties, a predictive model for the first localization-related device; and deploying the predictive model for the first localization-related device.

The step of determining a predictive model may comprise generating the predictive model based on at least one known predictive model respectively associated with device properties.

The step of determining a predictive model may comprise generating the predictive model by interpolating and/or extrapolating the at least one known predictive model based on the first set of properties and the device properties associated with the at least one known predictive model.

The method may further comprise the step of: adapting the predictive model for the first localization-related device based on observing performance of the first localization-related device, when the first localization-related device is active in the device network.

The step of determining a predictive model may comprise selecting a type of predictive model based on the first set of properties of the first localization-related device.

The step of deploying the predictive model may comprise deploying the predictive model in the first localization-related device.

The step of deploying the predictive model may comprise deploying the predictive model in a model aggregator configured to predict performance of a plurality of localization-related devices based on respective predictive models.

The predictive model may be used for workload allocation among localization-related devices of the device network.

The first set of properties may comprise hardware properties of the first localization-related device.

The hardware properties may comprise at least one of random-access memory, RAM, size, processor cores, processor type, processor model, and energy source.

An output of the predictive model of the first localization-related device may comprise any one or more of an application quality metric, an application performance metric, an application robustness metric, and application efficiency metric.

An output of the predictive model of the first localization-related device may comprise any one or more of a predicted energy consumption, and a predicted mapping error.

An input of the predictive model may be at least one of a current task, a previous task, a metric of a resource availability, and a current resource allocation for localization and/or mapping.

The device network may be configured to be used for SLAM, simultaneous localization and mapping, processing.

According to a second aspect, it is provided a predictor device for enabling predicting performance of a localization-related device in relation to localization and/or mapping. The localization-related device forms part of a device network. The predictor device comprises: a processor; and a memory storing instructions that, when executed by the processor, cause the predictor device to: detect that a first localization-related device joins the device network; obtain a first set of properties of the first localization-related device; determine, based on the first set of properties, a predictive model for the first localization-related device; and deploy the predictive model for the first localization-related device.

The instructions to determine a predictive model may comprise instructions that, when executed by the processor, cause the predictor device to generate the predictive model based on at least one known predictive model respectively associated with device properties.

The instructions to determine a predictive model may comprise instructions that, when executed by the processor, cause the predictor device to generate the predictive model by interpolating and/or extrapolating the at least one known predictive model based on the first set of properties and the device properties associated with the at least one known predictive model.

The predictor device may further comprise the instructions that, when executed by the processor, cause the predictor device to: adapt the predictive model for the first localization-related device based on observing performance of the first localization-related device, when the first localization-related device is active in the device network.

The instructions to determine a predictive model may comprise instructions that, when executed by the processor, cause the predictor device to select a type of predictive model based on the first set of properties of the first localization-related device.

The instructions to deploy the predictive model may comprise instructions that, when executed by the processor, cause the predictor device to deploy the predictive model in the first localization-related device.

The instructions to deploy the predictive model may comprise instructions that, when executed by the processor, cause the predictor device to deploy the predictive model in a model aggregator configured to predict performance of a plurality of localization-related devices based on respective predictive models.

The predictive model may be configured to be used for workload allocation among localization-related devices of the device network.

The first set of properties wherein comprise hardware properties of the first localization-related device.

The hardware properties wherein comprise at least one of RAM size, processor cores, processor type, processor model, and energy source.

An output of the predictive model of the first localization-related device wherein comprise any one or more of an application quality metric, an application performance metric, an application robustness metric, and application efficiency metric.

An output of the predictive model of the first localization-related device wherein comprise any one or more of a predicted energy consumption, and a predicted mapping error.

An input of the predictive model wherein be at least one of a current task, a previous task, a metric of a resource availability, and a current resource allocation for localization and/or mapping.

The device network may be configured to be used for SLAM, simultaneous localization and mapping, processing.

According to a third aspect, it is provided a computer program for enabling predicting performance of a localization-related device in relation to localization and/or mapping, the localization-related device forming part of a device network. The computer program comprises computer program code which, when executed on a predictor device causes the predictor device to: detect that a first localization-related device joins the device network; obtain a first set of properties of the first localization-related device; determine, based on the first set of properties, a predictive model for the first localization-related device; and deploy the predictive model for the first localization-related device.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 1 is a schematic diagram illustrating an environment in which embodiments presented herein can be applied;

FIGS. 2A-C are schematic diagrams illustrating embodiments of where the predictor device can be implemented;

FIG. 3 is a schematic diagram illustrating a predictive model;

DETAILED DESCRIPTION

Figure 4A:
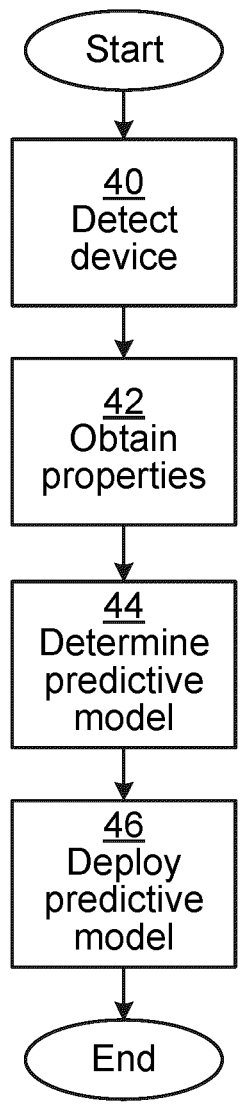
FIGS. 4A-B are flow charts illustrating embodiments of methods for enabling predicting performance of a localization-related device in relation to localization and/or mapping.

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

FIG. 1 is a schematic diagram illustrating an environment in which embodiments presented herein can be applied. The example shown in FIG. 1 is a physical space used in an AR context, e.g., in a space of several rooms 21a-f (e.g., an office or an apartment).

In this example, there are three localization-related devices 2a-c. The first localization-related device 2a and the second localization-related device 2b are mobile devices. These localization-related devices 2a-b can be in the form of AR equipment, such as a head mounted display (HMD), which allows the user to see both real-world objects and a virtual objects. The mobile localization-related devices 2a-b contain sensors (e.g., accelerometers, gyros, etc.) e.g., as part of an inertia measurement unit (IMU). The IMU is used to obtain data which contributes to determining the pose of the mobile localization-related devices 2a-b in a 3D space. The mobile localization-related devices 2a-b could also be implemented using a smartphone, a tablet computer, and autonomously mobile device (e.g., robot), or remote-controlled mobile devices.

A stationary localization-related device 2C is also provided. The stationary localization-related device 2c can be connected to mains power and is less resource constricted than the mobile localization-related devices 2a-b. For instance, the stationary localization-related device 2c can contain more CPU power, more Random-Access Memory (RAM) and more persistent storage. The stationary localization-related device 2c can e.g., be implemented using a stationary computer, e.g., desktop computer, mains-connected laptop computer or a server, and does not need to provide an AR interface.

The localization-related devices 2a-c are all connected to a communication network. The communication network can e.g., comprise any one or more of a local area network (LAN), a wide area network (WAN) such as the Internet and a cellular network.

Logically, the localization-related devices 2a-c form a device network 8, based on communication made possible by the communication network. Within the device network 8, tasks for localization and/or mapping can be distributed. This can e.g. be used to offload resource demanding tasks from the mobile localization-related devices 2a-b to the stationary localization-related device 2c. The distribution can be performed based on predicted performance, e.g. energy consumption and/or localization accuracy. The predicted performance is obtained using predictive models. There is a predictive model for each localization-related device 2a-c, but the same type of predictive model can be used for several devices when these are similar.

A model aggregator 3 is a device of the device network 8 that uses the predictive models for the localization-related devices 2a-c, e.g. to distribute tasks within the device network 8. The model aggregator 3 can optionally be implemented within a localization-related device, e.g. the stationary localization-related device 2c. In this embodiment, the model aggregator comprises a predictor device which is used to predict performance of the predictive models for the different localization-related devices 2a-c. Optionally, the model aggregator 3 is not a separate device and can e.g. be implemented in a localization-related device such as the stationary localization-related device 2C.

It is to be noted that the environment of FIG. 1 is only one example of where localization based on localization maps is supported. Embodiments presented herein can equally well be applied in other environments, such as for self-driving vehicles, industrial applications, indoor robotics, etc.

FIGS. 2A-C are schematic diagrams illustrating embodiments of where the predictor device 1 can be implemented.

In FIG. 2A, the predictor device 1 shown as implemented in the localization-related device 2. The localization-related device 2 is thus the host device for the predictor device 1 in this implementation. For instance, the predictor device 1 can be implemented in the stationary localization-related device 2c of FIG. 1.

In FIG. 2B, the predictor device 1 shown as implemented in the model aggregator 3. The model aggregator 3 is thus the host device for the predictor device 1 in this implementation. The model aggregator 3 which is already concerned with applying the predictive models, can then also house the predictor device 1.

In FIG. 2C, the predictor device 1 is shown as implemented as a stand-alone device. The predictor device 1 thus does not have a host device in this implementation.

FIG. 3 is a schematic diagram illustrating a predictive model 10. The predictive model 10 can be used to predict performance for any of the localization-related devices 2a-c of FIG. 1. Each localization-related device 2a-c can have a separate predictive model 10 or a predictive model 10 can be the same for some localization-related devices.

The predictive model 10 provides one or more outputs 12 as predictions based on one or more inputs 11.

The predictive model 10 can be selected from many different types, from simple, e.g., simple linear regression, to more complex, e.g., neural networks. The selection of a best-suited model is nontrivial: predictive models should provide sufficient accuracy to be effective, and, at the same time, should be sufficiently efficient to be possible to be invoked at runtime without the cost negating the benefit. Hence, different model structures can be deployed on different localization-related devices throughout the device network depending on the device properties and status. For example, the mobile (battery-powered) localization-related devices 2a-b may deploy a more complex and accurate model when battery level is high, and a more energy-efficient model with lower accuracy when battery level is critical. An energy-efficient device with limited computation capability may be restricted to only deploy simple linear models with power restrictions, while the mains-powered stationary localization-related device 2c may deploy a neural net with strict accuracy requirements.

The predictive model 10 can provide outputs 12 indicating predicted performance of localization-related (e.g. SLAM) tasks, and/or predicted energy consumption.

Some non-limiting examples of predictive models will now be presented, illustrating how the predictive model 10 can be used and its various inputs 11 and outputs 12. These examples are based on a system executing a Maplab SLAM application based on a 20 Hz monocular camera sensor, 200 Hz IMU sensor, and a 5G network.

In the following first and second examples, the system properties are integrated in the predictive models.

In the first example, the predictive model 10 is used to predict energy consumption of Rovioli localization given a constraint of a maximum trajectory error of 1 meter. The input 11 then contains the task: Rovioli localization and maximum allowable trajectory error: 1 m. The output 12 contains the energy consumption.

In the second example, the predictive model 10 is used to predict average trajectory error and energy consumption of Rovioli localization in a mobile device given the camera input rate, input entropy, and the SoC (System on Chip) power mode. The input 11 then contains task: Rovioli localization, power mode 4 (5 cores@2 GHz), input rate, 10 frames per second, and input entropy: 0.5. The output 12 contains the average trajectory error and energy consumption.

In the following third, fourth and fifth examples, the system properties are not integrated in the predictive models and instead form part of the input 11.

In the third example, the predictive model 10 is used to predict energy consumption of map merging running on an edge device, given a constraint of a resulting map with up to 50 nodes. The inputs 11 of the predictive model 10 are: task: map merging, maximum nodes allowed: 50, device configuration: edge device (8 ARM cores, 12 GB RAM). The output 12 contains energy consumption.

In the fourth example, the predictive model 10 is used to predict execution time of map merging running on an edge device, given the number of points to merge and the SoC power mode. The inputs 11 of the predictive model 10 are: task: map merging, power mode: 4 (5 cores@2 GHz), input map size: 2×200 nodes, device configuration: edge device (8 ARM cores, 12 GB RAM). The output 12 contains execution time and energy consumption.

In the fifth example, the predictive model 10 is used to predict execution time and energy consumption of map merging running on an edge device. In this case, the map merging is performed collaboratively over a 5G (fifth generation) network. The inputs 11 of the predictive model 10 are: task: map merging, network round-trip time (RTT): toms, task distribution: edge and mobile devices, power mode: 4 (5 CPU cores@2 GHz), input overlap: 20%, device configuration: edge device (8 ARM cores, 12 GB RAM), sensor: 20 Hz monocular camera. The outputs 12 of the predictive model 10 are: execution time and energy consumption.

Figure 4B:
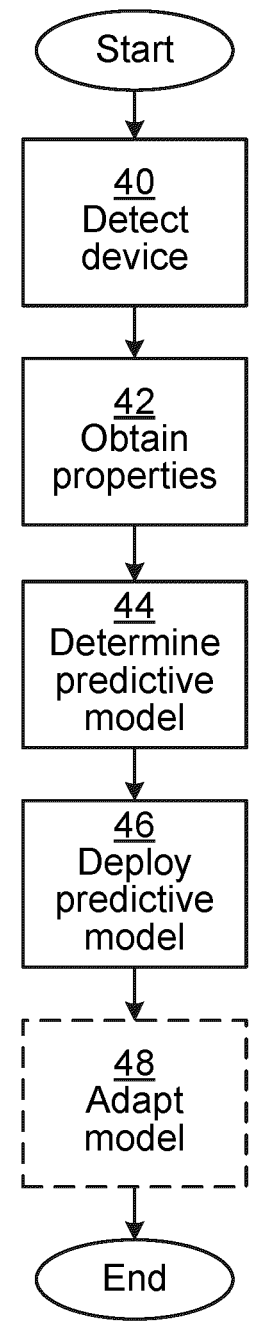

FIGS. 4A-B are flow charts illustrating embodiments of methods for enabling predicting performance of a localization-related device in relation to localization and/or mapping. As explained above, the localization-related device forms part of a device network 8. The device network can e.g. be a device network for SLAM processing. The method is performed in a predictor device 1.

In a detect device step 40, the predictor device 1 detects that a first localization-related device joins the device network 8. The first localization-related device can announce its presence, and thereby trigger its joining the device network, or the presence of the first localization-related device can be detected by the predictive device 1, e.g. by detecting network traffic to/from the first localization-related device, etc. It can be the predictor device 1, the model aggregator 3, or another device that admits the first localization-related device to the device network 8.

In an obtain properties step 42, the predictor device 1 obtains a first set of properties of the first localization-related device.

The first set of properties can e.g. comprise hardware properties of the first localization-related device, such as at least one of random-access memory (RAM), size, processor cores, processor type, processor model, and energy source. Such properties can be queried, e.g. from the operating system of the first localization-related device, and signaled to the predictor device 1.

In a determine predictive model step 44, the predictor device 1 determines, based on the first set of properties, a predictive model 10 for the first localization-related device.

In one embodiment, the predictive model 10 is generated based on at least one known predictive model respectively associated with device properties.

For instance, the predictive model 10 is obtained by interpolating and/or extrapolating the at least one known predictive model based on the first set of properties and the device properties associated with the at least one known predictive model.

In one example, if the hardware properties (e.g. CPU and RAM) of the first localization-related device is between the hardware properties of a second localization-related device and a third localization-related device, and there are linear-regression predictive models for these two devices, a new linear-regression predictive model can be obtained by interpolating the predictive models for the second and third localization-related devices. Extrapolation can be used analogously.

The type of predictive model 10 can be selected based on the first set of properties of the first localization-related device.

As explained above, an output 12 of the predictive model 10 of the first localization-related device can comprise any one or more of an application quality metric, an application performance metric, an application robustness metric, and application efficiency metric, where the application relates to a localization-related application, such as a SLAM application.

Alternatively or additionally, the output 12 of the predictive model 10 of the first localization-related device can comprise a predicted energy consumption and/or a predicted mapping error. The type of output from the predictive models can be adapted depending on the implementation.

Furthermore, an input 11 of the predictive model 10 can comprise at least one of a current task, a previous task, a metric of a resource availability, and a current resource allocation for localization and/or mapping.

If a generic base model is available for the target device in addition to our current device updated model, using the difference between the current device parameters, generic model parameters, and target device parameters, update the base model for the target device.

If only our current device updated model is available, generate a new model based on the difference between current and target device parameters.

In a deploy predictive model step 46, the predictor device 1 deploys the predictive model 10 for the first localization-related device. The predictive model 10 can be deployed in the first localization-related device. Alternatively or additionally, the predictive model 10 is deployed in a model aggregator 3 configured to predict performance of a plurality of localization-related devices 2a, 2b, 2c based on respective predictive models.

The predictive model 10 can e.g. be used for workload allocation among localization-related devices 2a, 2b, 2c of the device network 8.

Looking now to FIG. 4B, in order to avoid unnecessary repetition of text, only new or modified steps compared to the embodiments of FIG. 4A will be described.

In an optional adapt model step 48, the predictor device 1 adapts the predictive model 10 for the first localization-related device based on observing performance of the first localization-related device, when the first localization-related device is active in the device network 8.

The observed performance can e.g. be based on performance indicators such as the value of the innovation of the estimator/filter (e.g. kalman filter) used in the localization algorithm. The innovation is calculated as the difference between a value measured by the sensor and the same value estimated by the estimator. The difference gives the estimation error, and if this is a large value then it means that the estimator is performing badly and so that is an indicator of low performance. In the case of visual-inertial SLAM, the value measured by the sensor would be the 2D pixel location of a feature in a frame at time k, and the estimated 2D pixel location of the same feature at time k given by the estimator. Yet other performance measurements could be related to the execution speed or power consumption, as performance is defined to be worse the lower the execution speed is, or the higher the energy consumption rate is.

Using the embodiments presented herein, a predictive model can be obtained and used straight-away for a new localization-related device joining the device network. The new localization-related device (or its type) may even not have been seen before in the network, but a predictive model can still be obtained, e.g. on a generic base model. No direct observation of the new localization-related device is needed, since the predictive model is obtained based on properties of the localization-related device.

Using the embodiments presented, a system designer could infer the effectiveness of a specific setup of a device network (e.g. a collaborative SLAM system) before actual deployment. The setup defines the type and number of localization-related devices that form part of the device network. Moreover, the system designer could infer the effect of adding/removing localization-related devices to the system after deployment.

Additionally, the presented embodiments enable distribution of tasks (e.g. SLAM tasks) within the device network. The predictive models for the localization-related devices allow an adaptive (re)distribution of workload during execution in the device network.

A more detailed implementation example will be presented for illustration purposes. Consider a device network containing a single location-related device ("known device"). The single location-related device is a stationary computer with a 32 GB of RAM, 8-core arm 64 CPU (Central Processing Unit, and 512 core GPU (Graphics Processing Unit). A recurrent neural-network (RNN) predictive model has been trained for the known device and is deployed on the known device. The known device is executing map merging. A new, of previously unknown type, location-related device ("new device") joins the network. The known device comprises the predictor device and queries the new device over the radio network for its system parameters to discover that the new device is battery-powered, with a 4-core CPU and 4 GB of RAM, and a camera attached. The known device determines that its neural-network predictive model is too complex for the new device. The known device uses its neural-network predictive model to generate predicted performance samples for currently executing map merging. Using the generated samples, the known device performs least-squares linear regression to generate a simple linear model for deployment on the new device. Before deploying, the linear model is linearly scaled (i.e. extrapolated) by modifying coefficients to 25% based on the difference of the device parameters (CPU, RAM, etc.) for the known device and the new device. The model is transferred over the network from the known device to the new device. The new device monitors the deployed model to improve the model based on observation, and broaden the model applicability for new algorithms.

Figure 5:
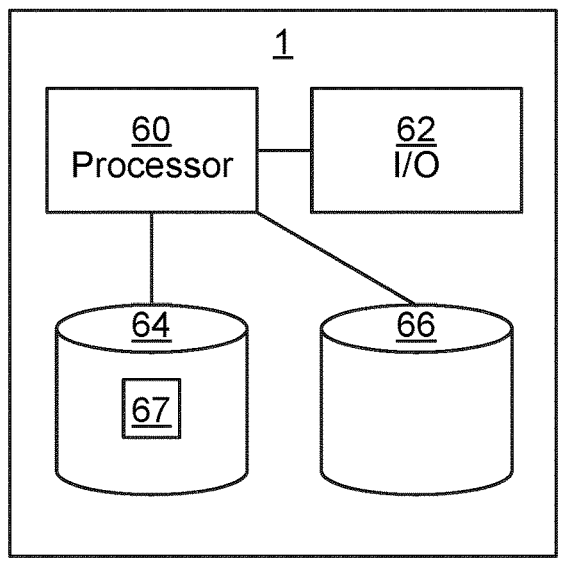
FIG. 5 is a schematic diagram illustrating components of the predictor device of FIG. 1 and FIGS. 2A-C.

FIG. 5 is a schematic diagram illustrating components of the predictor device 1 of FIG. 1 and FIGS. 2A-C. It is to be noted that one or more of the mentioned components can be shared with the host device when applicable. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A and 4B above.

The memory 64 can be any combination of RAM and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The predictor device 1 further comprises an I/O interface 62 for communicating with external and/or internal entities. Optionally, the I/O interface 62 also includes a user interface.

Other components of the predictor device 1 are omitted in order not to obscure the concepts presented herein.

Figure 6:
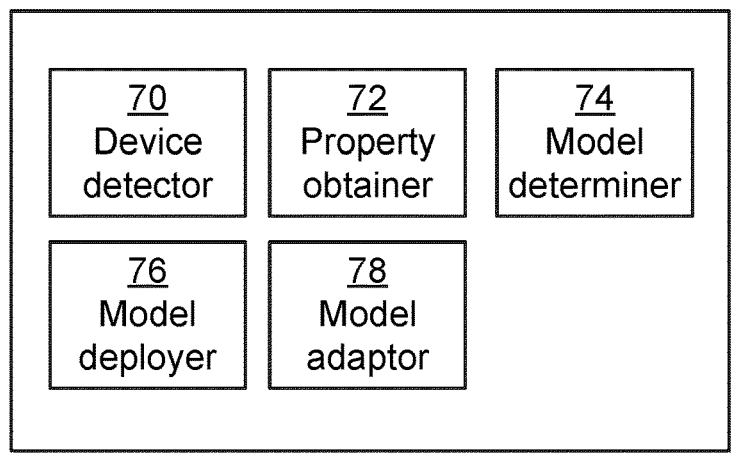
FIG. 6 is a schematic diagram showing functional modules of the predictor device of FIG. 1 and FIGS. 2A-C according to one embodiment.

FIG. 6 is a schematic diagram showing functional modules of the predictor device 1 of FIG. 1 and FIGS. 2A-C according to one embodiment. The modules are implemented using software instructions such as a computer program executing in the predictor device 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A and 4B.

A device detector 70 corresponds to step 40. A property obtainer 72 corresponds to step 42. A model determiner corresponds to step 44. A model deployer 76 corresponds to step 46. A model adaptor 78 corresponds to step 48.

Figure 7:
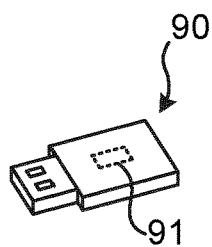
FIG. 7 shows one example of a computer program product comprising computer readable means.

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method performed by a predictor device for facilitating predictions related to localization and/or mapping performance of one or more devices of a device network, the method comprising:
    detecting that a first localization-related device has joined the device network;
    obtaining a first set of properties of the first localization-related device;
    determining, based on the first set of properties, a predictive model for the first localization-related device;
    deploying the predictive model for the first localization-related device; and
    subsequently adapting the predictive model for the first localization-related device based on observed performance of the first localization-related device while the first localization-related device is active in the device network.

2. The method according to claim 1, wherein determining a predictive model comprises generating the predictive model by interpolating and/or extrapolating at least one known predictive model based on the following:
   the first set of properties of the first localization-related device, and
   device properties associated with the at least one known predictive model.

3. The method according to claim 1, wherein the observed performance of the first localization-related device is based on one or more of the following metrics or indicators: estimation error, execution speed, and energy consumption.

4. The method according to claim 1, wherein determining a predictive model comprises selecting a type of predictive model according to the first set of properties of the first localization-related device.

5. The method according to claim 1, wherein the predictive model is deployed in one or more of the following: the first localization-related device, and a model aggregator configured to predict performance of a plurality of localization-related devices based on respective predictive models.

6. The method according to claim 1, wherein the first set of properties comprises hardware properties of the first localization-related device, including one or more of the following: random-access memory (RAM) size, number of processor cores, processor type, processor model, and energy source.

7. The method according to claim 1, wherein the predictive model provides one or more of the following outputs: an application quality metric, an application performance metric, an application robustness metric, an application efficiency metric, a predicted energy consumption, and a predicted mapping error.

8. The method according to claim 1, wherein the predictive model has one or more of the following inputs: a current task, a previous task, a metric of a resource availability, and a current resource allocation for localization and/or mapping.

9. The method according to claim 1, wherein one or more of the following applies:
   the device network is configured to be used for simultaneous localization and mapping (SLAM) processing; and
   the predictive model is used for workload allocation among localization-related devices of the device network.

10. A predictor device configured to facilitate predictions related to localization and/or mapping performance of one or more devices of a device network, the predictor device comprising:
   a processor; and
   a memory storing instructions that, when executed by the processor, cause the predictor device to:
      detect that a first localization-related device has joined the device network;
      obtain a first set of properties of the first localization-related device;
      determine, based on the first set of properties, a predictive model for the first localization-related device;
      deploy the predictive model for the first localization-related device; and
      subsequently adapt the predictive model for the first localization-related device based on observed performance of the first localization-related device while the first localization-related device is active in the device network.

11. The predictor device according to claim 10, wherein execution of the instructions by the processor cause the prediction device to determine a predictive model based on generating the predictive model by interpolating and/or extrapolating at least one known predictive model based on the following:
   the first set of properties of the first localization-related device, and
   device properties associated with the at least one known predictive model.

12. The predictor device according to claim 10, wherein the observed performance of the first localization-related device is based on one or more of the following metrics or indicators: estimation error, execution speed, and energy consumption.

13. The predictor device according to claim 10, wherein execution of the instructions by the processor cause the prediction device to determine a predictive model based on selecting a type of predictive model according to the first set of properties of the first localization-related device.

14. The predictor device according to claim 10, wherein the predictive model is deployed in one or more of the following: the first localization-related device, and a model aggregator configured to predict performance of a plurality of localization-related devices based on respective predictive models.

15. The predictor device according to claim 10, wherein the first set of properties comprises hardware properties of the first localization-related device, including one or more of the following: random-access memory (RAM) size, number of processor cores, processor type, processor model, and energy source.

16. The predictor device according to claim 10, wherein the predictive model provides one or more of the following outputs: an application quality metric, an application performance metric, an application robustness metric, an application efficiency metric, a predicted energy consumption, and a predicted mapping error.

17. The predictor device according to claim 10, wherein the predictive model has one or more of the following inputs: a current task, a previous task, a metric of a resource availability, and a current resource allocation for localization and/or mapping.

18. The predictor device according to claim 10, wherein one or more of the following applies:
   the device network is configured to be used for simultaneous localization and mapping (SLAM) processing; and
   the predictive model is used for workload allocation among localization-related devices of the device network.

* * * * *